US010151863B2

(12) United States Patent
Chan et al.

(10) Patent No.: US 10,151,863 B2
(45) Date of Patent: Dec. 11, 2018

(54) OPTICAL GRATING

(71) Applicants: Agency for Science, Technology and Research, Singapore (SG); Temasek Polytechnic, Singapore (SG)

(72) Inventors: Chee Fatt Chan, Singapore (SG); Beng Soon Tan, Singapore (SG); Yun Xu, Singapore (SG); Bee Khuan Jaslyn Law, Singapore (SG); Hong Yee Low, Singapore (SG)

(73) Assignees: Agency for Science, Technology and Research, Singapore (SG); Temasek Polytechnic, Singapore (SG)

( * ) Notice: Subject to any disclaimer, the term of this patent is extended or adjusted under 35 U.S.C. 154(b) by 37 days.

(21) Appl. No.: 14/420,833

(22) PCT Filed: Aug. 12, 2013

(86) PCT No.: PCT/SG2013/000340
§ 371 (c)(1),
(2) Date: Feb. 10, 2015

(87) PCT Pub. No.: WO2014/025318
PCT Pub. Date: Feb. 13, 2014

(65) Prior Publication Data
US 2015/0241613 A1 Aug. 27, 2015

(30) Foreign Application Priority Data
Aug. 10, 2012 (SG) ................ 201205942-4

(51) Int. Cl.
*G02B 27/22* (2018.01)
*G02B 5/30* (2006.01)
*G02B 5/18* (2006.01)
*G02B 27/26* (2006.01)

(52) U.S. Cl.
CPC ......... *G02B 5/3058* (2013.01); *G02B 5/1847* (2013.01); *G02B 27/2214* (2013.01); *G02B 27/26* (2013.01); *G02B 27/225* (2013.01)

(58) Field of Classification Search
CPC .... G02B 5/1847; G02B 5/3058; G02B 27/26; G02B 27/2214; G02B 27/225; G02B 5/30;
(Continued)

(56) References Cited

U.S. PATENT DOCUMENTS

| 8,611,007 B2 * | 12/2013 | Davis | B82Y 20/00 359/485.05 |
| 2006/0056024 A1 | 3/2006 | Ahn et al. | |
| 2013/0250411 A1 * | 9/2013 | Bangerter | G02B 5/30 359/483.01 |

FOREIGN PATENT DOCUMENTS

| JP | 2010-117646 | 5/2010 |
| JP | 2010117646 A * | 5/2010 |
| WO | WO-2014/025318 | 2/2014 |

OTHER PUBLICATIONS

"International Application No. PCT/SG2013/000340, International Preliminary Report on Patentability dated Feb. 10, 2015", 5 pgs.
(Continued)

*Primary Examiner* — Mustak Choudhury
(74) *Attorney, Agent, or Firm* — Schwegman Lundberg & Woessner, P.A.

(57) ABSTRACT

According to one aspect of the invention, there is provided an optical grating comprising a substrate comprising a plurality of protrusions with a space in between any two adjacent protrusions; and a cap provided on at least one of the plurality of protrusions at an end that is furthest from the substrate, wherein the cap has a higher degree of optical attenuation compared to the substrate material and wherein the combination of each protrusion and the respective cap thereon has a generally symmetric cross-sectional profile.

19 Claims, 13 Drawing Sheets

(58) Field of Classification Search
CPC .. G02B 6/0018; G02B 6/0028; G02B 6/0036; G02B 6/0053; G02B 6/0061; G02B 27/0043; G02B 27/0101; G02B 27/0172; G02B 27/22; G02B 5/1809; G02B 5/3033; G02B 5/3041; G02B 27/286; G02B 1/08; G02B 1/12; G02B 5/18; G03B 21/14; B82Y 20/00; H04N 13/305; H04N 13/359; G02F 1/1323; G02F 1/133753
USPC .... 359/462, 485.05, 483.01, 487.03, 337.21, 359/563, 566, 569, 572; 29/592; 216/24; 264/1.31
See application file for complete search history.

(56) References Cited

OTHER PUBLICATIONS

"International Application No. PCT/SG2013/000340, International Search Report and Written Opinion dated Sep. 24, 2013", (Sep. 24, 2013), 9 pgs.

Ahn, Seh-Won, et al., "Fabrication of a 50 nm half-pitch wire grid polarizer using nanoimprint lithography", Nanotechnology, 16, 1874, (Jul. 22, 2005), 1874-1877.

Chen, Lei, et al., "Large flexible nanowire grid visible polarizer made by nanoimprint lithography", Applied Physics Letters, vol. 90, Issue 6, 063111-063111-3, Feb. 2007, (Feb. 2007), 063111-063111-3.

Lin, Chun-Hung, et al., "Direct imprinting on a polycarbonate substrate with a compressed air press for polarizer applications", Microelectronic Engineering, vol. 88, Issue 8, Aug. 2011, pp. 2026-2029, (Aug. 2011), 2026-2029.

\* cited by examiner

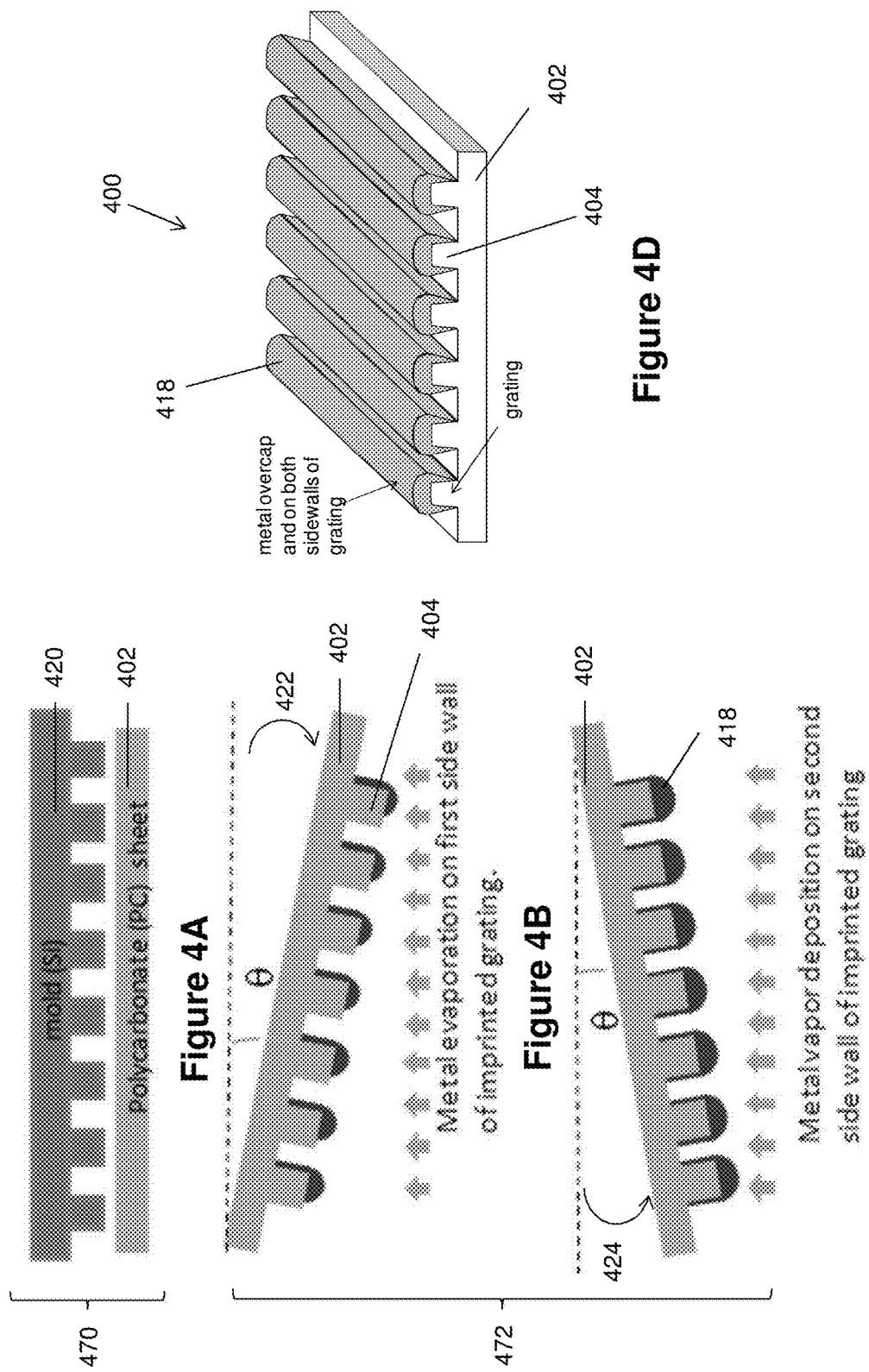

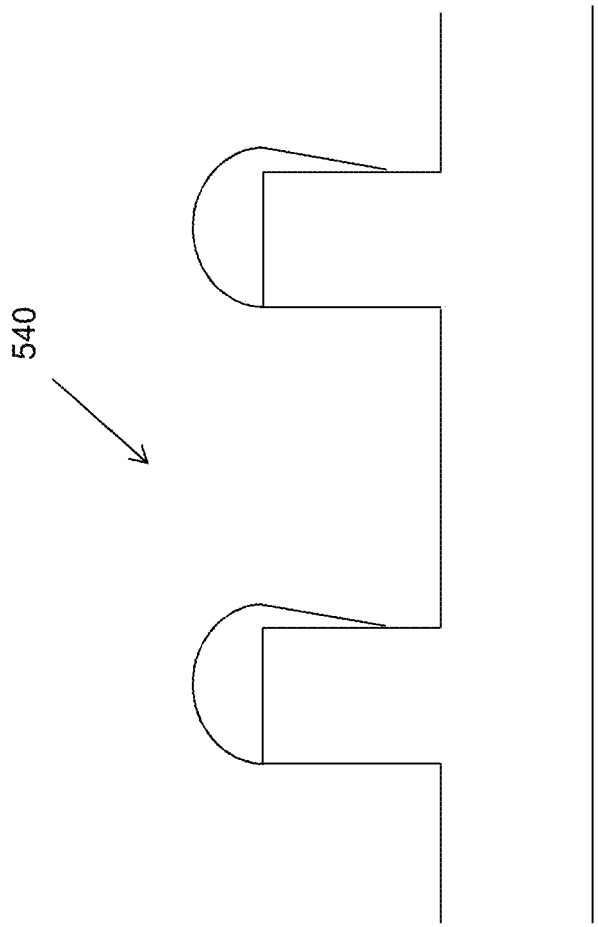

US 10,151,863 B2

OPTICAL GRATING

PRIORITY CLAIM TO RELATED APPLICATIONS

This application is a U.S. national stage application filed under 35 U.S.C. § 371 from International Application Serial No. PCT/SG2013/000340, which was filed Aug. 12, 2013, and published as WO 2014/025318 on Feb. 13, 2014, and which claims priority to Singapore Application No. 201205942-4, filed Aug. 10, 2012, which applications and publication are incorporated by reference as if reproduced herein and made a part hereof in their entirety, and the benefit of priority of each of which is claimed herein.

FIELD OF INVENTION

The invention relates generally to an optical grating.

BACKGROUND

It has been demonstrated that nanowire grid polarizers comprising a metal grating, traditionally fabricated on glass substrates, can also be fabricated on plastic films. Compared to glass, plastic is cheap, allows fabrication over a large area with high throughput and finds use in applications which need to be lightweight and flexible (e.g. printed electronics, wearable electronics).

For example, the publications "Large flexible nanowire grid visible polarizer made by nanoimprint lithography" (by Chen, L., Wang, J. J., Walters, F., Deng, X. G., Buonanno, M., Tai, S. & Liu, X. M. (2007) Applied Physics Letters, 90) and "Direct imprinting on a polycarbonate substrate with a compressed air press for polarizer applications" (by Lin, C. H., Lin, H. H., Chen, W. Y. & Cheng, T. C. (2011), Microelectronic Engineering, 88, 2026-2029) disclose optical element structures that have non-flat spectral response of light over a visible wavelength range. This non-flat spectral response results in an undesirable reddish artifact for plastic nanowire grid polarizer operating in transmission mode. A further discussion on the operating principle of a nanowire grid polarizer is described further below, with reference to FIG. 10A.

A need therefore exists to provide an optical element and its method of fabrication that can address the undesirable attributes, such as the associated reddish artifact, of optical element structure fabricated from existing plastic nanowire grid polarizers.

SUMMARY

According to one aspect of the invention, there is provided an optical grating comprising a substrate comprising a plurality of protrusions with a space in between any two adjacent protrusions; and a cap provided on at least one of the plurality of protrusions at an end that is furthest from the substrate, wherein the cap has a higher degree of optical attenuation compared to the substrate material and wherein the combination of each protrusion and the respective cap thereon has a generally symmetric cross-sectional profile.

According to another aspect of the invention, there is provided a method of forming an optical grating, the method comprising providing a substrate; forming a plurality of protrusions on the substrate with a space in between any two adjacent protrusions, providing a cap on at least one of the plurality of protrusions at an end that is furthest from the substrate, wherein the cap has a higher degree of optical attenuation compared to the substrate material and wherein the combination of each protrusion and the respective cap thereon has a generally symmetric cross-sectional profile.

BRIEF DESCRIPTION OF THE DRAWINGS

Example embodiments of the invention will be better understood and readily apparent to one of ordinary skill in the art from the following written description, by way of example only, and in conjunction with the drawings. The drawings are not necessarily to scale, emphasis instead generally being placed upon illustrating the principles of the invention, in which:

FIGS. 4A to 4C show an exemplary process to fabricate the preferred embodiment of an optical grating directly onto a substrate, with FIG. 4D providing a schematic of the fabricated optical grating.

FIGS. 5B and 5C show the cross-section of a conventional optical grating.

DEFINITIONS

The following provides sample, but not exhaustive, definitions for expressions used throughout various embodiments disclosed herein.

The phrase "optical grating" may mean an optical element which acts upon light passing through the optical element. Examples of optical elements include lenses, mirrors, prisms, nanowire grid polarizers and parallax barriers, whereby various embodiments of the optical grating disclosed herein function either as a nanowire grid polarizer or a parallax barrier. Accordingly, the phrases "optical grating" and "optical element" may be used interchangeably throughout the entire specification.

Figure 10A:
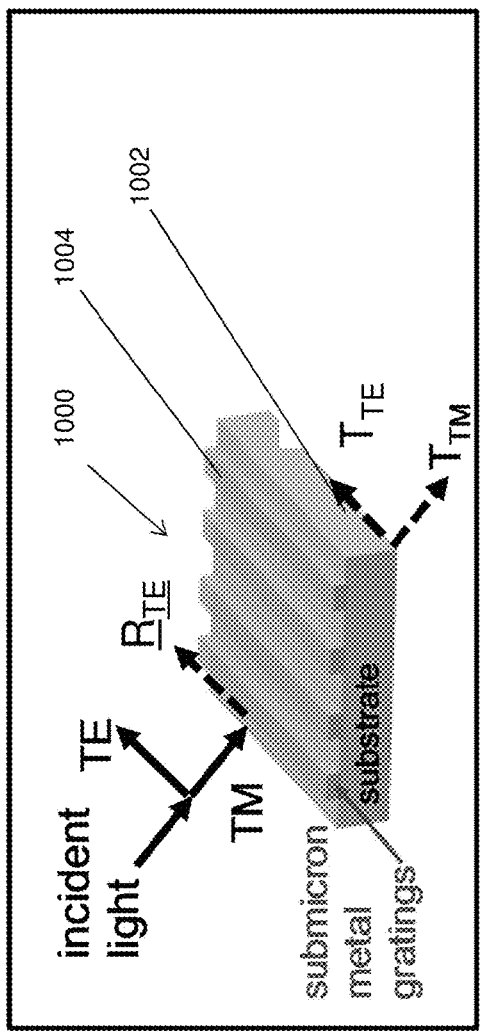
FIGS. 10A and 10B each respectively illustrates the operating principle of a nanowire grid polarizer and a parallax barrier.
Figure 10B:
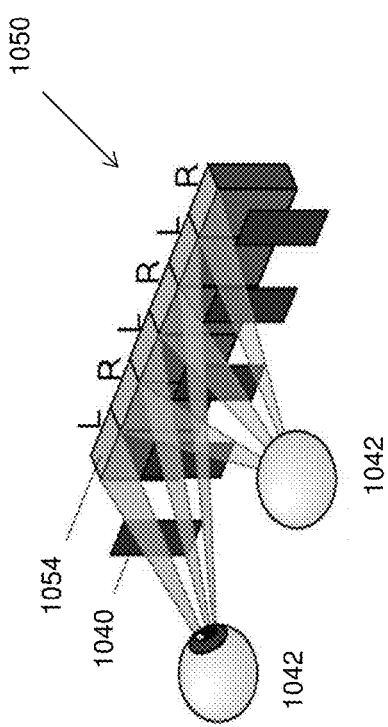

The operating principle of a nanowire grid polarizer and a parallax barrier is described with reference to FIGS. 10A and 10B respectively. FIG. 10A shows a nanowire grid polarizer 1000. The nanowire grid polarizer 1000 has subwavelength metal gratings 1004 on a transparent substrate 1002 (e.g. glass, plastics). The submicron size metal gratings 1004 provide a series of alternate opaque and transparent slits. In principle, the optical characteristics of the polarizer 1000 enables incident light with polarization parallel to the metal grating (TE-polarized light, denoted TE) to be reflected (denoted $R_{TE}$) with little amount of this incident TE-polarized light transmitted through the polarizer (the transmitted TE-polarized light is denoted $T_{TE}$), while enabling the incident light with perpendicular polarization (TM-polarized light, denoted TM) to be transmitted through the polarizer (the transmitted TM-polarized light is denoted $T_{TM}$). The spectra of $T_{TM}$ and $T_{TE}$ of the polarizer 1000 can be measured using a UV-vis Microspectrophotometer (such as "CRAIC QDI 2010") across the visible wavelength range from 400 nm to 800 nm. A contrast ratio is calculated from the ratio of ($T_{TM}/T_{TE}$). Transmission spectrum ($T_{TM}$) and the contrast ratio ($T_{TM}/T_{TE}$) are the two main optical performance parameters of polarizers. FIG. 10B shows a system 1050 for creating a parallax barrier. The parallax barrier is created by placing an optical element 1040 in front of an image source (such as a liquid crystal display 1054), so that each eye 1042 sees a different sets of pixels through parallax brought about by the optical element 1040, thereby creating a sense of depth required for 3D imaging. The optical element 1040 provides a series of alternate opaque and transparent slits of micron-size gratings.

The term "protrusion" may mean a structure that extends from a surface of a substrate. In various embodiments, where the optical grating is referred to as an optical element, the term "grating" may be used to refer to the "protrusion". Accordingly, the terms "grating" and "protrusion" may be used interchangeably throughout the entire specification.

The phrase "cross-sectional arc profile" is to be understood in the context of a fabrication process performed at microscopic levels, whereby such a "cross-sectional arc profile" may refer to a profile with a deliberately fabricated curvature due to the process of fabrication.

DETAILED DESCRIPTION

In the following description, various embodiments are described with reference to the drawings, where like reference characters generally refer to the same parts throughout the different views.

Figure 1A:
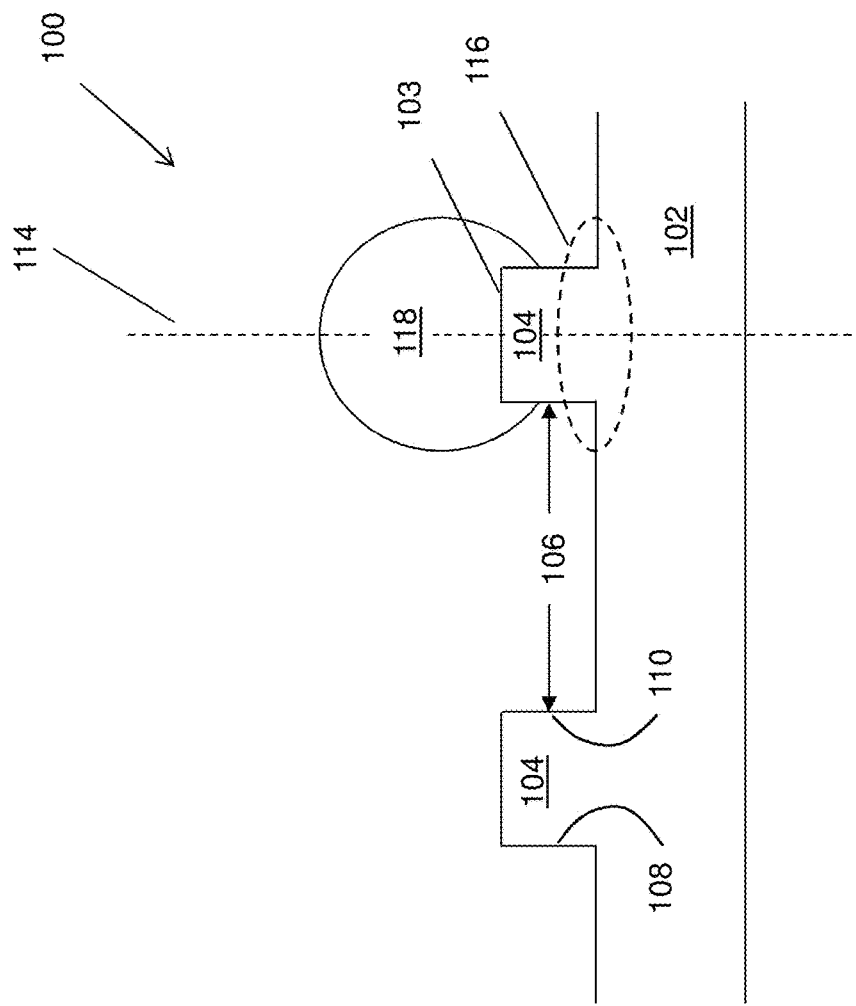
FIG. 1A shows the cross-sectional structure of an optical grating according to a first embodiment.

FIG. 1A shows the cross-sectional structure of an optical grating 100 according to a first embodiment.

The optical grating 100 includes a substrate 102 comprising a plurality of protrusions 104. A space 106 exists in between any two adjacent protrusions 104. A cap 118 is provided on at least one of the plurality of protrusions 104 at an end 103 that is furthest from the substrate 102. The cap 118 has a higher degree of optical attenuation compared to the substrate 102 material. The combination of each protrusion 104 and the respective cap 118 thereon has a generally symmetric cross-sectional profile.

The combination of each protrusion 104 and the respective cap 118 thereon is generally symmetric about a longitudinal axis 114 extending along a centre and intersecting a base 116 of the respective protrusion 104. This symmetry provides the optical grating 100 with a flat optical spectral response. Accordingly, an identical degree of symmetry is not required, but rather a degree of symmetry that allows the optical grating 100 to provide a flat optical spectral response.

Figure 1B:
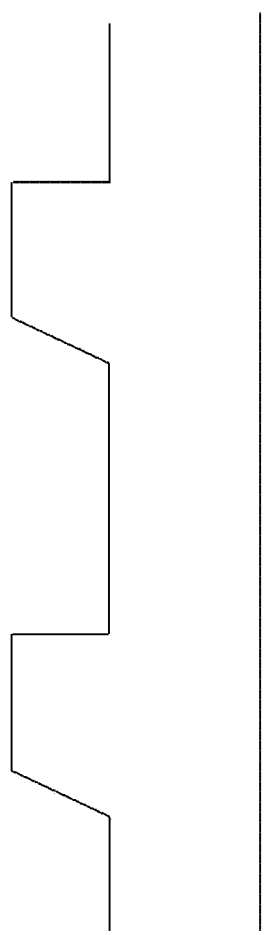
FIG. 1B shows the cross-sectional structure of an optical grating having a non-symmetric cross-sectional profile.

It has been found that the symmetric profile such as those presented by the cross-sectional arc profile 112 of each protrusion 104 provides a flatter spectral response compared to the case where each protrusion 104 were to have non-symmetric structure (e.g. straight sidewalls with a cross-sectional linear profile, see FIG. 1B). While an arced cross-sectional profile is shown in FIG. 1A, other profiles such as square shaped or round shaped are possible, as long as the overall cross-sectional profile of the cap 118 and the respective protrusion 104 has symmetry.

The cap 118 is preferably opaque. Such an opaque overcap can be made using metals or dielectric with light-absorbent additive molecules. The degree of opacity (i.e. degree of optical attenuation) in metals is controlled by the thickness of the metals. Using metals to realise the cap 118 provides the cap 118 with reflective properties. The degree of opacity (i.e. degree of optical attenuation) in a dielectric is controlled by the amount of light-absorbent additive molecules (e.g. pigments, dyes, colorants and photosensitive emulsions, etc.) present in the dielectric. Using a dielectric to realise the cap 118 provides the cap 118 with non-reflective properties.

The physical properties of the cap 118 imparted by the material used to fabricate the cap 118 determines whether the optical grating 100 functions as a parallax barrier or a nanowire grid polarizer. Given that a non-reflective overcap does not reflect TE polarized light, an opaque and reflective overcap allows the optical grating 100 to function as a nanowire grid polarizer. An opaque and reflective overcap; or an opaque and non-reflective overcap allows the optical grating 100 to function as a parallax barrier. In the case where the cap 118 is opaque and reflective, the optical grating 100 will function as a parallax barrier when the optical grating 100 is used under conditions allowing the optical grating 100 to function as a parallax barrier; or as a nanowire grid polarizer when the optical grating 100 is used under conditions allowing the optical grating 100 to function as a parallax barrier. The optical grating 100 will function as a parallax barrier when it is placed in front of an image source, such as a liquid crystal display (LCD). The optical grating 100 will function as a nanowire grid polarizer when used in any linear polarization required equipment or techniques such as a flexible LCD or an optical filter.

The cap 118 has a shape such that both sidewalls 108, 110 of each of the plurality of protrusions 104 have a cross-sectional arc profile 112 along at least a portion of both of these sidewalls 108, 100.

The plurality of protrusions 104 are fabricated simultaneously with the substrate 102 and therefore are integral to and made of the same material as the substrate 102. The plurality of protrusions 104 may be arranged in an array. To achieve such an array, one embodiment has any two adjacent protrusions 104 spaced apart about equally (i.e. the space 106 between any two adjacent protrusions 104 is around the same). Each protrusion 104 may have a width from a range 10 nm to 300 nm, with a suitable width being for example 70 nm. The distance for the space 106 may be from a range 10 nm to 300 nm, with a suitable distance being for example 70 nm. In another embodiment, the array may be realised by the optical grating 100 having a repetitive pattern, whereby two adjacent protrusions 104 are spaced 106 a first distance apart and another two adjacent protrusions 104 are spaced 106 a second distance apart, the size of the first distance being different from that of the second distance.

As shown in FIG. 1A, the cross-sectional arc profile 112 is present along, a portion of the entire sidewalls 108, 110. However, although not shown, the cross-sectional arc profile 112 can also extend over the entire surface of the sidewalls 108, 110. Also, although not shown, the cross-sectional arc profile 112 can commence from the portions of both sidewalls 108, 110 that are adjacent to their respective base 116. Rather, the portion of both sidewalls 108, 110, having the cross-sectional arc profile 112, is proximate to the end 103 of each of the plurality of protrusions 104 that is furthest from the substrate 102.

Figure 2:
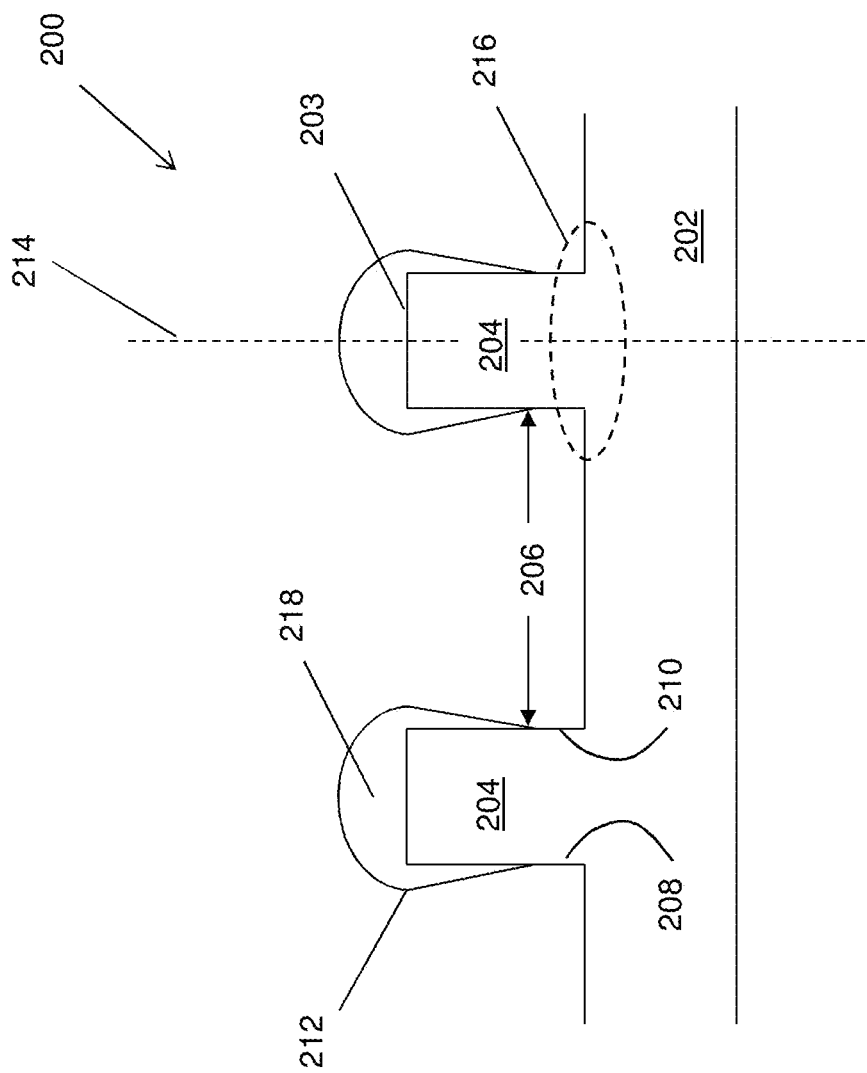
FIG. 2 shows the cross-sectional structure of an optical grating according to a preferred embodiment.

FIG. 2 shows the cross-sectional structure of an optical grating 200 according to a preferred embodiment.

The optical grating 200 of FIG. 2 includes a substrate 202 comprising a plurality of protrusions 204. A space 206 exists in between any two adjacent protrusions 204. The cross-sectional profile 212 of each of the sidewalls 208, 210 has a convex shape relative to a longitudinal axis 214 extending along the centre and intersecting the base 216 of the respective protrusion 204.

Like the optical grating 100 of FIG. 1A, the overall structure of each of the plurality of protrusions 204 and its respective cap 218 has a combined cross-sectional profile that is generally symmetrical about a longitudinal axis 214 extending along a centre and intersecting a base 216 of each respective protrusion 104. The cap 218 also has a higher degree of optical attenuation compared to the substrate 202 material. However, while the optical grating 100 of FIG. 1A has the cap 118 only provided on a selected number of the plurality of protrusions 104, the optical grating 200 of FIG. 2 has the cap 218 provided on each of the plurality of protrusions 204 at an end 203 that is furthest from the substrate 202.

Similar to the optical grating 100 of FIG. 1A, the plurality of protrusions 204 may be arranged in an array. The plurality of protrusions 204 are also fabricated simultaneously with the substrate 202 and therefore are integral to and made of the same material as the substrate 202. The substrate 202 may be made from direct imprinting onto a plastic sheet (which includes all types of thermoplastic films, e.g. polycarbonate (PC), polymethylmethacrylate (PMMA) and polyethylene so that the substrate 202 is flexible.

The cap 218 may comprise material that has a higher degree of optical attenuation, compared to the substrate 202 material. In various embodiments, the cap 218 may be opaque. The cap 218 may be made of the same materials as the cap 118 of FIG. 1A. Thus, the cap 218 may be made of material that is both opaque and reflective (e.g. metals) whereby the cap 218 may comprise one or more of the following materials: aluminum, gold and chromium. Alternatively, the cap 218 may be made of material that is both opaque and non-reflective, whereby the cap 218 may comprise of dielectric with light-absorbent additive molecules (e.g pigments, dyes, colorants and photosensitive emulsions etc.)

Figure 3:
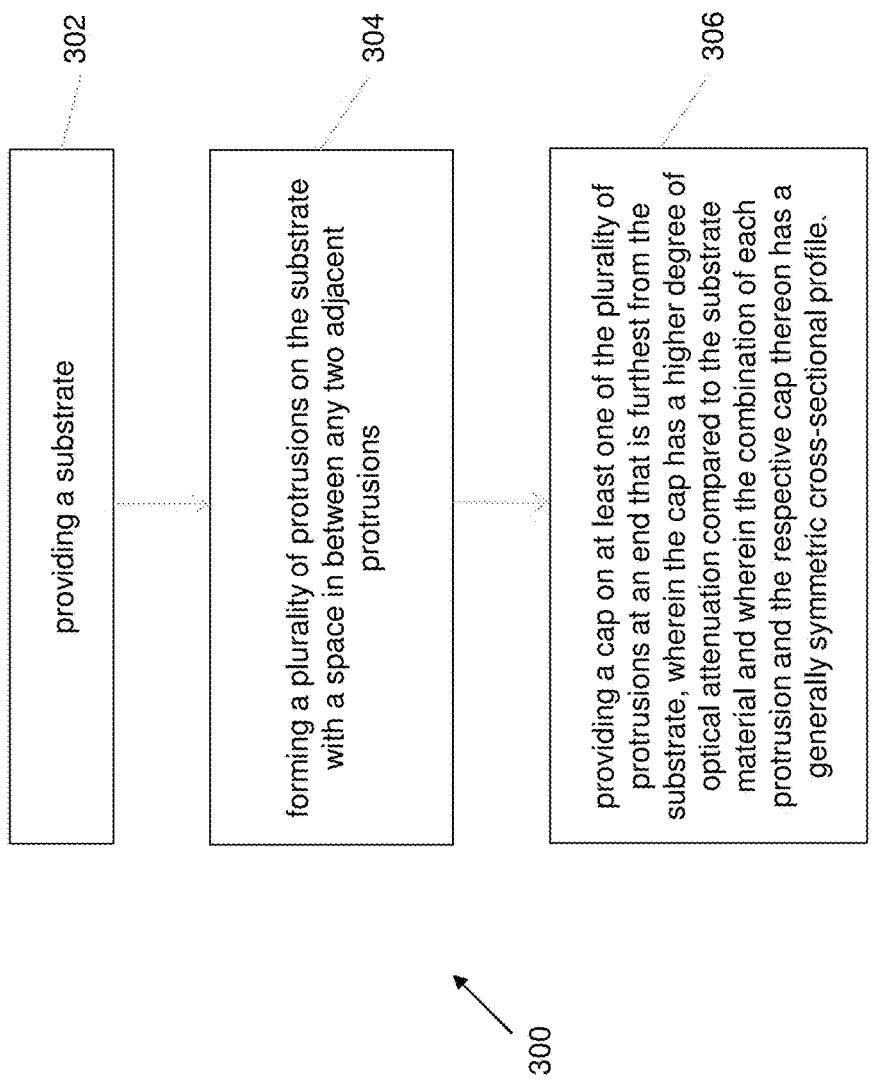
FIG. 3 shows a flowchart of a method to fabricate an optical grating according to the first embodiment shown in FIG. 2.

FIG. 3 shows a flowchart 300 of a method to fabricate an optical grating according to the first embodiment shown in FIG. 2.

In step 302, a substrate is provided.

In step 304, a plurality of protrusions on the substrate is formed with a space in between any two adjacent protrusions.

In step 306, a cap is provided on at least one of the plurality of protrusions at an end that is furthest from the substrate, wherein the cap has a higher degree of optical attenuation compared to the substrate material and wherein the combination of each protrusion and the respective cap thereon has a generally symmetric cross-sectional profile.

In one implementation of the method of FIG. 3 to fabricate an optical grating in accordance to the preferred embodiment (see FIG. 2), the cap provides each of the plurality of protrusions with sidewalls having a cross-sectional arc profile along at least a portion of the sidewalls. The cap may comprise different material from the substrate. The cap is preferably opaque. The cap may be made of material that is both opaque and reflective. It is also possible for the cap to be made of material that is opaque and non-reflective. The cap may be provided by a process which forms a portion of the cap on one sidewall of each protrusion and forms a remainder of the cap on the other sidewall, i.e. an opposite sidewall of the same protrusion. This process is described in greater detail below with reference to FIGS. 4A to 4C.

FIGS. 4A to 4C show an exemplary process of this implementation to fabricate the preferred embodiment of an optical grating 400 (see FIG. 4D) directly onto a substrate 402, such as commercially available free-standing polycarbonate (PC) (Innox, PC2151, thickness 0.25 mm) sheet, through a two-step process. Other materials such as plastic, polycarbonate and polymethylmethacrylate are also usable.

Prior to performing a nanoimprint process shown in FIG. 4A, a silicon mould 420 with topography (such as 70 nm line, 70 nm space, 300 nm height grating), designed to provide a protrusion pattern on the substrate 402, was fabricated. The mould 420 was cleaned using oxygen plasma and silanized with an anti-stiction monolayer (FDTS, (1H, 1H,2H,2H)-Perfluorodecyltrichlorosilane). The silanization treatment was used to reduce the surface energy of the mould 420 to facilitate easy demoulding of the mould 420 from the substrate 402.

In a first step 470 shown in FIG. 4A, thermal nanoimprinting using a nanoimprinter (such as an "Obducat AB" Nanoimprinter) was employed to directly pattern the substrate 402 with the desired grating feature from the silicon mould 420. A batch or roll-to-roll processing can be used for the thermal nanoimprinting. The silicon mould 420 was placed in direct contact with the substrate 402 at an imprinting temperature of 180° C. and at a pressure of 60 bar for a duration of 10 minutes. Following this, the temperature of the system was cooled down to 25° C. and demoulding was performed at this temperature. The grating pattern feature from the silicon mold was thus imprinted onto the substrate 402.

In a second step 472 shown in FIGS. 4B and 4C, the protrusions 404 formed from the imprinted grating on the substrate 402 undergo a "dual-side coating" method to form a cap 418 on each of the protrusions 404. Equipment that can be used to coat the protrusions 404 with the cap 418 include a metal evaporator/coater/sputterer (such as an "Edwards Auto306 Ebeam Evaporation System"). The metal evaporator/coater/sputterer can be integrated with the nanoimprinter, described above, into a single system. Accordingly, the formation of the plurality of protrusions 404 and the provision of the cap 418 may be performed in an integrated system where imprinting and metal evaporation/coating/sputtering occur.

A portion of the cap 418 is formed on one of the both sidewalls of each protrusion 404 by tilting θ the substrate 402 in a first direction 422 and forming the portion of the cap 418 on the one sidewall. The remainder of the cap 418 is formed on the other of the both sidewalls by tilting θ the substrate 402 in a second direction 424 that is opposite to the first direction and forming the remainder of the cap 418 on the other sidewall.

The angle θ at which the substrate 402 is tilted in the first direction 422 may be approximately the same as angle θ at which the substrate is tilted in the second direction 424. The angle θ may range from 1° to 89°, with an exemplary tilt angle θ being around 5 to 30°. The angle θ of tilting during cap formation will affect the light transmittance percentage of the resulting optical grating 400 (see FIG. 4D). For cap 418 formation at a smaller tilt angle (such as θ=1°), the optical grating 400 has higher light transmittance and less light blockage as compared to cap 418 formation done at a higher tilt angle (such as θ=10°). If aluminum is evaporated onto the substrate 402 in FIGS. 4B and 4C, aluminum metal will be deposited onto the top of the grating 400, i.e. onto the two sidewalls of each protrusion 404 of the grating 400. FIG. 4D shows a schematic illustration of the resulting optical grating 400 following this "dual-side coating".

The two-step process and the two pieces of equipment used to implement this two-step process (both described above) provide a simple way to fabricate an optical grating in accordance to an embodiment of the invention. In comparison to other optical gratings (such as: 1) "Fabrication of a 50 nm half-pitch wire grid polarizer using nanoimprint lithography" by Ahn, S. W., Lee, K. D., Kim, J. S., Kim, S. H., Park, J. D., Lee, S. H. and Yoon, P. W. (2005). Nanotechnology, 16, 1874-1877; and 2) "Wire Grid Polarizer and Manufacturing Method Thereof" by Ahn, S. W., Lee, K. D., Kim, J. S., Kim, S. H., Park, J. D., Lee, S. H. and Yoon, P. W. (2006)) that require at least five to six processing steps performed using four processing equipment, it is easier and cheaper to fabricate an optical gratings in accordance to an embodiment of the invention. The four processing equipment to manufacture such other optical gratings include a metal evaporator, a spin-coater, a nanoimprint system and a reactive ion etcher for metal etching/reactive ion etcher for resist etching. An exemplary six step process includes: (1) metal deposition onto a glass substrate; (2) spin-coating a resist onto the metal over the glass substrate; (3) nanoimprinting to transfer the pattern from a mould onto the resist; (4) reactive ion etching to remove residual layer; (5) reactive ion etching to etch metal; and (6) resist stripping by reactive ion etching. An exemplary five step process includes: (1) spin-coating a resist onto a glass substrate; (2) nanoimprinting to transfer the pattern from a mould onto the resist; (3) reactive ion etching to etch residual layer resist; (4) metal evaporation; and (5) lift-off process using acetone solution.

Figure 5A:
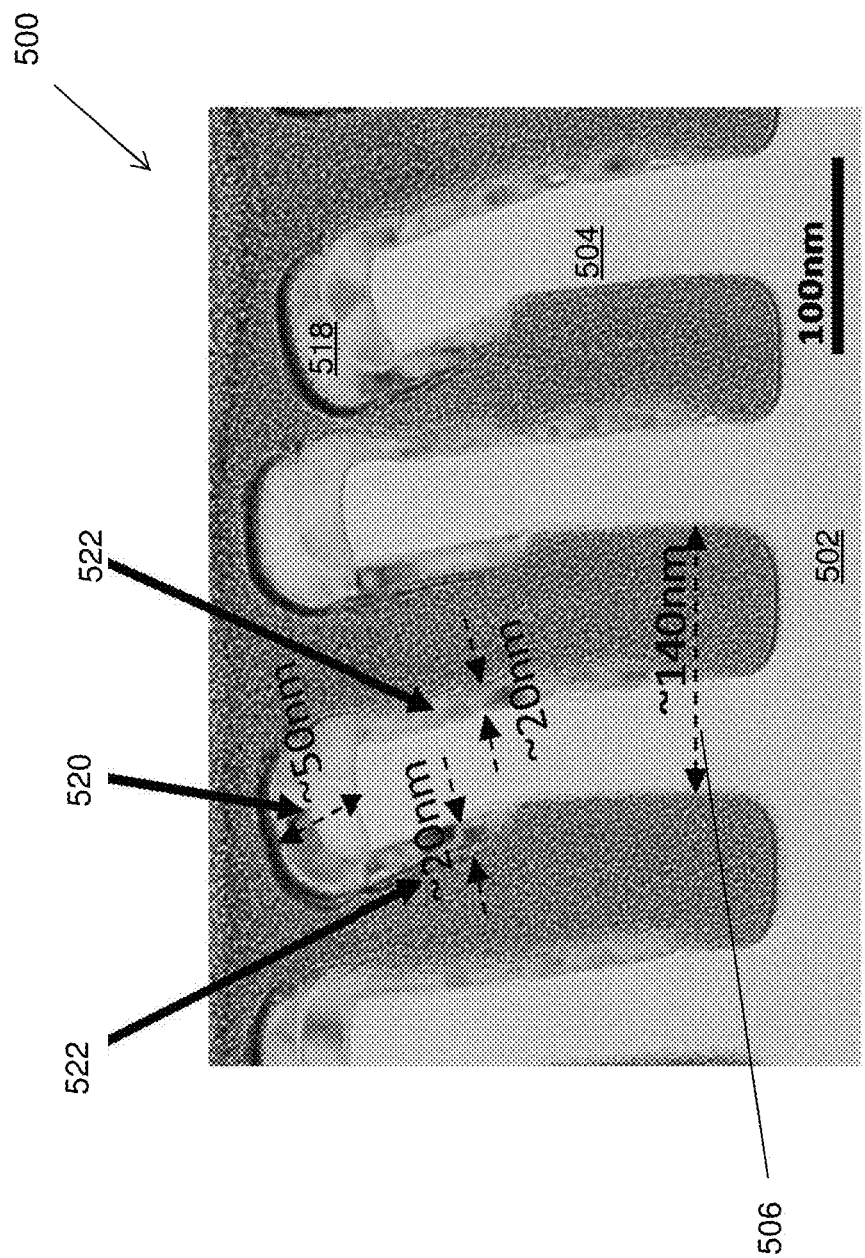
FIG. 5A shows the cross-section of a structure of an optical grating fabricated using the method described with respect to FIGS. 4A to 4C.

FIG. 5A shows the cross-section of a structure 500 of an optical grating fabricated using the "dual-side coating" method described with respect to FIGS. 4A to 4C. The cross-section view is obtained using transmission emission microscopy, such as by way of a "Phillips CM300".

The structure 500 comprises a grating having a plurality of protrusions 504, each having thickness of around 70 nm, patterned on a plastic substrate 502. Adjacent protrusions 504 are spaced around 70 nm apart, for a pitch distance 506 of around 140 nm. Each protrusion 504 has a metal over-cap 518 of non-uniform thickness, such as a top thickness 520 of around 50 nm (measured from the top of each protrusion 504) and a side thickness 522 of around 20 nm thickness (measured from the sidewalls of each protrusion 504). The metal over-cap 520 provides at least a portion of both sidewalls of each of the plurality of protrusions 504 with a cross-sectional arc profile. Ideally, the metal deposition is desired to be symmetrical on both sides of each protrusion 504. However, this is not achieved in the fabricated structure 500 due to a slight tilt of the grating because of its high aspect ratio, and thus a slight shadow deposition effect on the fabricated structure 500.

Figure 6A:
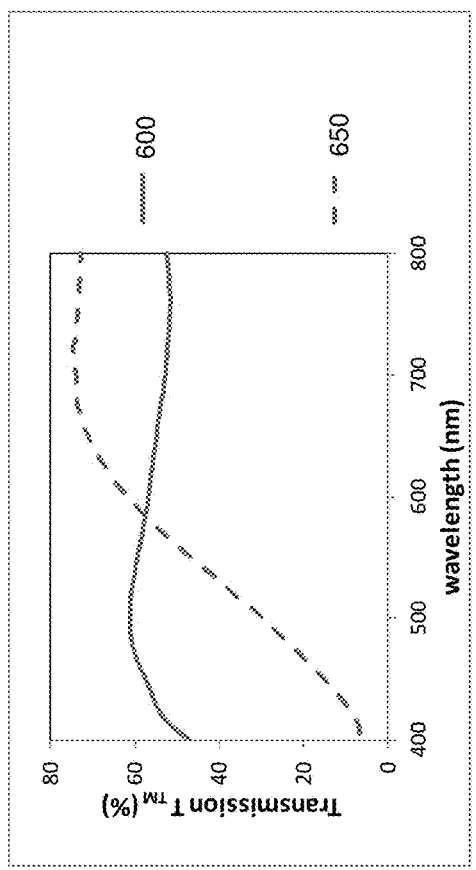
FIG. 6A shows a plot of the measured transmission spectrum of TM polarized light ($T_{TM}$) against the visible light wavelength range from 400 nm to 800 nm for a fabricated optical grating in accordance to the preferred embodiment and the conventional optical grating shown in FIGS. 5A and 5C respectively.
Figure 6B:
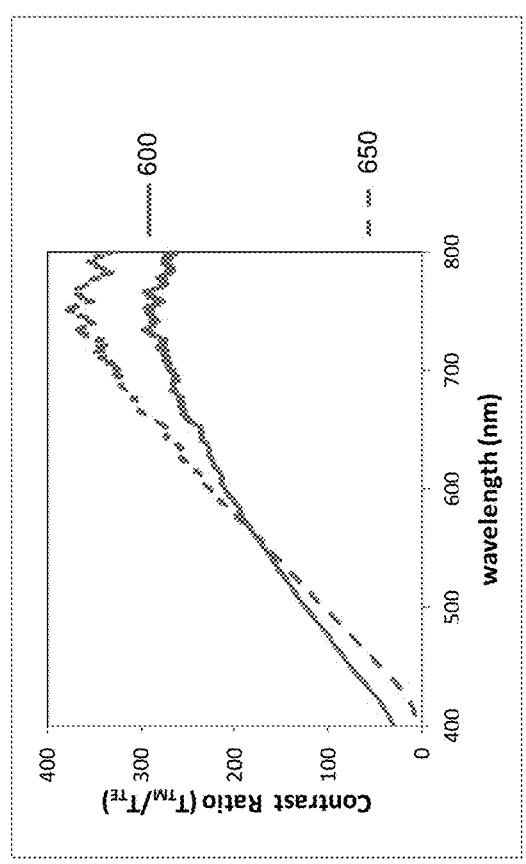
FIG. 6B shows a plot of the contrast ratio between transmitted TE polarized light and transmitted TM polarized light ($T_{TM}/T_{TE}$) against the visible light wavelength range from 400 nm to 800 nm for a fabricated optical grating in accordance to the preferred embodiment and a conventional optical grating.

FIG. 6A shows a plot of the measured transmission spectrum of TM polarized light ($T_{TM}$) against the visible light wavelength range from 400 nm to 800 nm. FIG. 6B shows a plot of the contrast ratio between transmitted TE polarized light and transmitted TM polarized light ($T_{TM}/T_{TE}$) against the same visible light wavelength range from 400 nm to 800 nm.

Figure 5C:
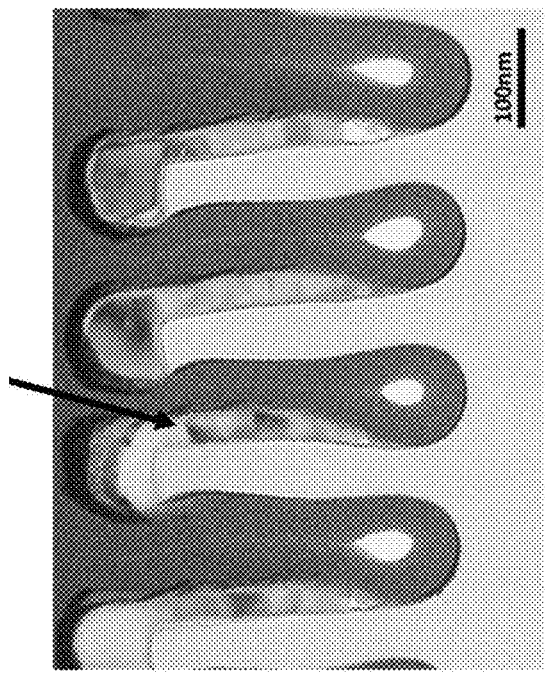

In both FIGS. 6A and 6B, each curve 600 represents the result obtained for the structure 500 of FIG. 5A, while each curve 650 represents the result obtained for a conventional nanowire grid polarizer 540, schematically shown in FIG. 5B, with a transmission emission microscopic image shown in FIG. 5C. The results show that a flatter spectral response is achieved by the structure 500 (i.e. an optical grating according to the preferred embodiment) compared to the conventional structure. The contrast ratios for both the structure 500 and the conventional nanowire grid polarizer are comparable.

Figure 7A:
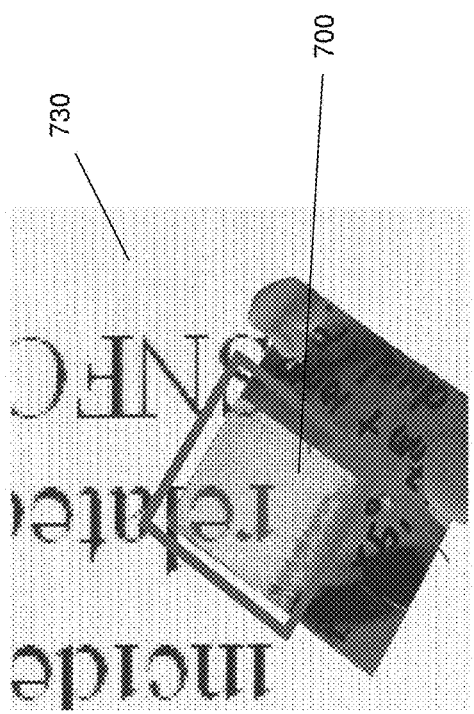
FIG. 7A shows a picture of a document viewed through an optical film fabricated from the structure of FIG. 5A.
Figure 7B:
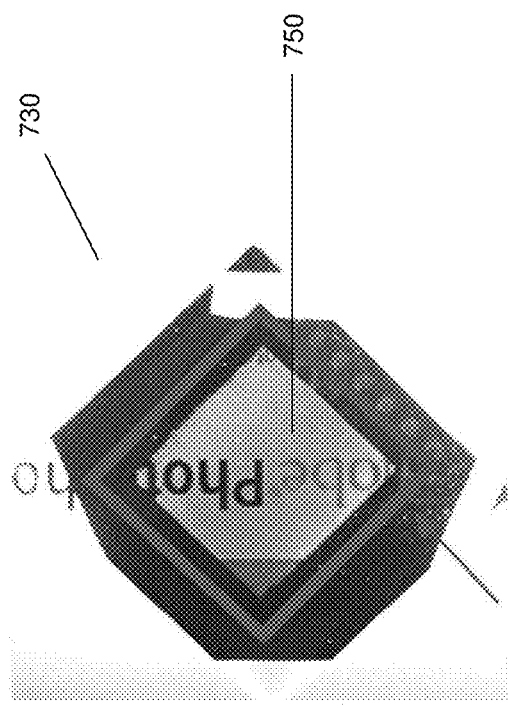
FIG. 7B shows a picture of a document viewed through an optical film fabricated from the conventional nanowire grid polarizer shown in FIG. 5C.

FIG. 7A shows a picture of a document 730 viewed through an optical film 700 fabricated from the structure 500 of FIG. 5A. FIG. 7B shows a picture of the document 730 viewed through an optical film 750 fabricated from the nanowire grid polarizer of FIG. 5C. Thus, in both FIGS. 7A and 7B, the optical films 700 and 750 are operated under transmission mode, i.e. viewing of the document 730 through the respective optical film 700, 750.

FIG. 7B shows a reddish artifact for the document 730 viewed through the optical film 750. The reddish artifact is caused by the non-constant transmission intensity spectrum across the visible wavelength range (graphically represented by the curve 650 in FIG. 6A), which is not desirable to the user. On the other hand, no such reddish artifact is present for the document 730 viewed through the optical film 700. The flatter spectral response (graphically represented by the curve 600 in FIG. 6A) across the visible wavelength (400-800 nm) eliminates the reddish artifact observed in the conventional nanowire grid polarizer operating in the transmission mode, allowing the structure 500 to be used in applications that require a nanowire grid polarizer.

Figure 8:
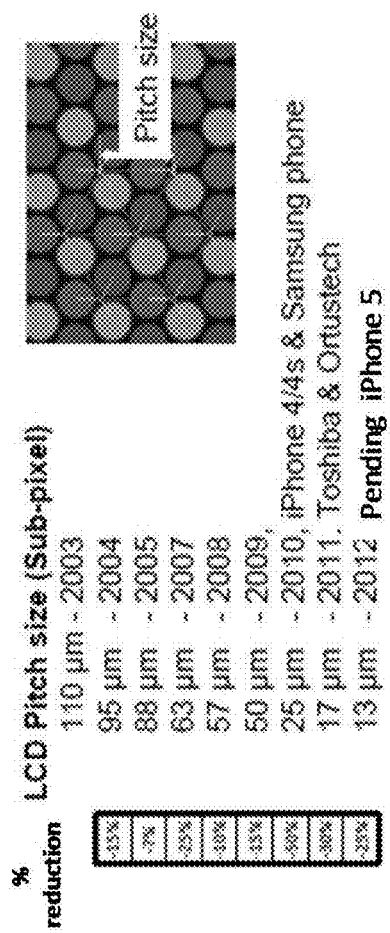
FIG. 8 shows the trend of sub-pixel size between 2003 and 2012.

The structure 500 of FIG. 5A provides a series of alternate opaque and transparent slits of micron-size gratings. Due to its high resolution (brought about by each protrusion 504 having a width of 70 nm) and sharing a similar structure to that of a parallax barrier (compare against the optical element 1040 of FIG. 10), the structure 500 also functions as a high resolution plastic parallax barrier film, finding applications for auto-stereoscopic display with sub-pixel resolution below 1 μm. Although present liquid crystal display (LCD) technology is still using sub-pixel resolution in the micrometer scale, the trend (see FIG. 8) between 2003 and 2012 to improve LCD sub-pixel resolution is to reduce sub-pixel size below the micrometer scale. Thus, the optical film 700 shown in FIG. 7A can thus function as a parallax barrier for auto-stereoscopic display for future displays with sub-pixel resolution below 1 μm.

From the above, an optical grating according to various embodiments allow for an optical element with a structure fabricated on a substrate to function either as a nanowire grid polarizer or as a high resolution parallax barrier (PB) film for auto-stereoscopic display. Applications of such an optical grating include placement into an auto-stereoscopic display and optical films.

Figure 9A:
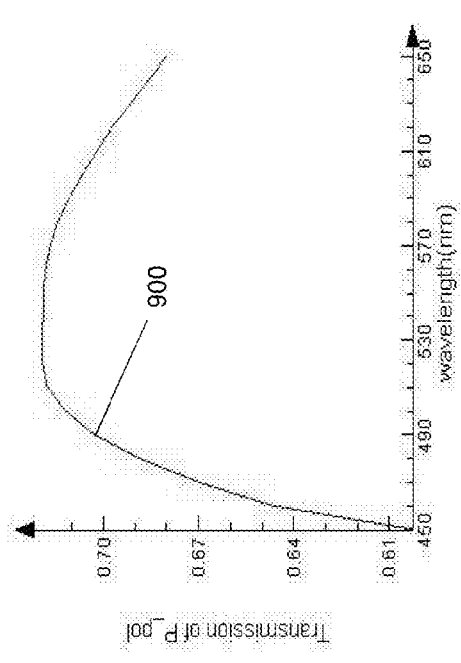
FIG. 9A shows simulation results of a plot of the measured transmission spectrum of TM polarized light ($T_{TM}$) against the light wavelength range from 450 nm to 650 nm for an optical grating in accordance to the preferred embodiment.
Figure 9B:
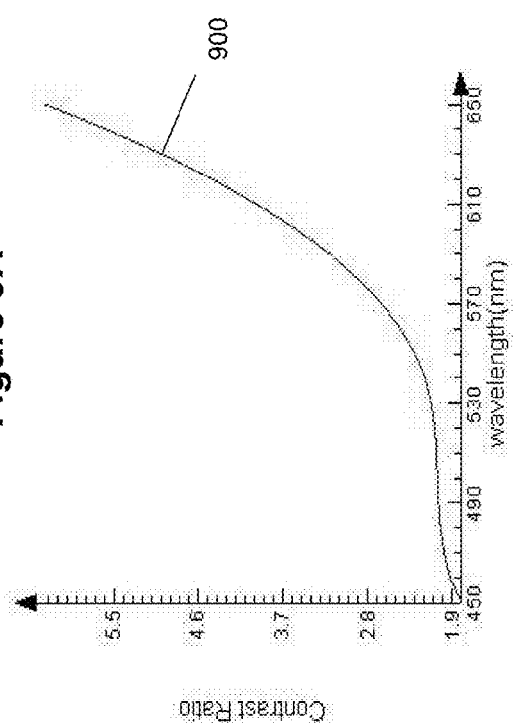
FIG. 9B shows simulation results of a plot of the contrast ratio between transmitted TE polarized light and transmitted TM polarized light ($T_{TM}/T_{TE}$) against the light wavelength range from 450 nm to 650 nm for an optical grating in accordance to the preferred embodiment.

FIG. 9A shows a plot of the simulated transmission spectrum of TM polarized light ($T_{TM}$) against the light wavelength range from 450 nm to 650 nm. FIG. 9B shows a plot of the simulated curve of the contrast ratio between the transmitted TE polarized light and transmitted TM polarized light ($T_{TM}/T_{TE}$) against the same light wavelength range from 450 nm to 650 nm.

In both FIGS. 9A and 9B, each curve 900 represents simulated results obtained using the optical grating 200 of FIG. 2. The simulated results were generated using software from FDTD Solutions™. The results obtained from the fabricated structure 500 of FIG. 5A verify the simulation results, as seen from comparing the curves 600 shown in FIGS. 6A and 6B against the curves 900 shown in FIGS. 9A and 9B.

It will be appreciated by a person skilled in the art that numerous variations and/or modifications may be made to the present invention as shown in the embodiments without departing from a spirit or scope of the invention as broadly described. The embodiments are, therefore, to be considered in all respects to be illustrative and not restrictive.

The invention claimed is:

1. An optical grating comprising:
   a substrate comprising:
   a plurality of protrusions with a space in between any two adjacent protrusions; and
   a cap provided on at least one of the plurality of protrusions at an end that is furthest from the substrate, wherein the cap has a higher degree of optical attenuation compared to the substrate material and wherein the combination of each protrusion and the respective cap thereon has a generally symmetric cross-sectional profile, and wherein the cap provides each of the plurality of protrusions with sidewalls having a cross-sectional arc profile along at least a portion of the sidewalls, and wherein the cap is made of a dielectric material with light-absorbent additive molecules and is opaque and non-reflective to function as a parallax barrier.

2. The optical grating of claim 1, wherein the substrate is made from direct imprinting onto a plastic sheet so the substrate is flexible.

3. The optical grating of claim 1, wherein the plurality of protrusions are arranged in an array and have a width of 70 nm.

4. The optical grating of claim 1, wherein the protrusions are arranged to form a series of transparent slits that function as a plastic parallax barrier film.

5. The optical grating of claim 1, wherein the cap comprises different material from the substrate, and the space in between any two adjacent protrusions is 70 nm.

6. The optical grating of claim 1, wherein the substrate is a polymer that includes polycarbonate.

7. The optical grating of claim 1, wherein the substrate, the plurality of protrusions, and the cap are configured as at least a portion of an auto-stereoscopic display.

8. The optical grating of claim 1, wherein the substrate, the plurality of protrusions, and the cap are configured as at least a portion of an optical film.

9. A method of forming an optical grating, the method comprising:
   providing a substrate;
   forming a plurality of protrusions on the substrate with a space in between any two adjacent protrusions; and
   providing a cap on at least one of the plurality of protrusions at an end that is furthest from the substrate;
   wherein the cap has a higher degree of optical attenuation compared to the substrate material and wherein the combination of each protrusion and the respective cap thereon has a generally symmetric cross-sectional profile and wherein the cap provides each of the plurality of protrusions with sidewalls having a cross-sectional arc profile along at least a portion of the sidewalls, and wherein the cap is made of a dielectric material with light-absorbent additive molecules and is opaque and non-reflective to function as a parallax barrier.

10. The method of claim 9 further comprising:
   forming the substrate by direct imprinting onto a plastic sheet so the substrate is flexible.

11. The method of claim 9, wherein the cap is provided by forming a portion of the cap on one sidewall of each protrusion and forming a remainder of the cap on an opposite sidewall of the same protrusion.

12. The method of claim 11, wherein forming the cap on the sidewalls comprises:
   tilting the substrate in a first direction; and
   forming the portion of the cap on the one sidewall; and
   forming the remainder of the cap on the opposite sidewalls comprises:
   tilting the substrate in a second direction that is opposite to the first direction; and
   forming the remainder of the cap on the opposite sidewall.

13. The method of claim 12, wherein an angle at which the substrate is tilted in the first direction is approximately the same as angle at which the substrate is tilted in the second direction.

14. The method of claim 13, wherein the angle of tilt ranges from 1° to 89°.

15. The method of claim 11, wherein the cap is formed by any one or more of the following techniques: evaporation, deposition and sputter.

16. The method of claim 9, wherein the substrate is fabricated from flexible material.

17. The method of claim 9, wherein the substrate comprises any one or more of the following materials: plastic, polymethylmethacrylate, polycarbonate and polyethylene.

18. The method of claim 9, wherein the protrusions are arranged to form a series of transparent slits that function as a plastic parallax barrier film.

19. The method of claim 9, wherein the cap has a width equal to the space in between any two adjacent protrusions.

* * * * *